Nov. 7, 1967 C. O. OLSON, JR 3,351,869

SHORT MICROWAVE PULSE GENERATOR

Filed June 29, 1965

(a)

(b)

INVENTOR
CARL O. OLSON

BY James R Murray
[signature]
ATTORNEYS

United States Patent Office 3,351,869

Patented Nov. 7, 1967

3,351,869

SHORT MICROWAVE PULSE GENERATOR

Carl O. Olson, Jr., Burke, Va., assignor to the United States of America as represented by the Secretary of the Navy Filed June 29, 1965, Ser. No. 468,177
7 Claims. (Cl. 331—77)

The invention described herein may be manufactured and used by or for the Government of the United States of America for governmental purposes without the payment of any royalties thereon or therefor.

This application is a continuation-in-part of application Ser. No. 291,220, filed June 27, 1963, and now abandoned, for Short Pulse Generator.

The present invention relates to a short microwave pulse generator and more particularly to a pulse generator employing a coaxial-to-waveguide junction in a novel application.

Designers of radar have long recognized the desirability of generating short pulses of energy, largely because the ability of a radar to distinguish separate objects that are close together, sometimes called range resolution, is determined by the duration of the transmitted pulse. Prior to the present invention, the generation of extremely short pulses of microwave energy, that is of a duration of approximately $10^{-9}$ seconds, was difficult to accomplish and usually resulted from the use of non-linear devices such as magnetrons or travelling-wave-tubes. In general the use of these non-linear devices for the purpose of generating short pulses of microwave energy was unsatisfactory.

The present invention provides an improved type of device which produces the desired extremely short pulses of microwave energy. This is accomplished in a device wherein the internal geometric dimensions and electrical connections of a coaxial-to-waveguide junction are utilized in a novel manner to isolate and propagate only the desired frequency band from the frequency spectrum of a modulating pulse.

An object of the present invention, therefore, is the novel use of a coaxial-to-waveguide junction.

Another object is to provide a generator which is capable of producing extremely short pulses of microwave energy.

Still another object is to provide a generator which is capable of producing extremely short pulses of microwave energy which are suitable for use in a radar.

Yet another object is to provide a generator which is capable of producing extremely short pulses of microwave energy by utilizing the internal geometric dimensions and electrical connections of a coaxial-to-waveguide junction to isolate and propagate the desired frequency components from the frequency spectrum of a modulating pulse.

The exact nature of this invention as well as other objects and advantages thereof will be readily apparent from consideration of the following specification relating to the annexed drawing in which.

Briefly described, the invention contemplates the use of more or less standard components combined in a unique configuration so as to produce extremely short pulses of microwave energy which are suitable for use with radar systems.

Figure 1:
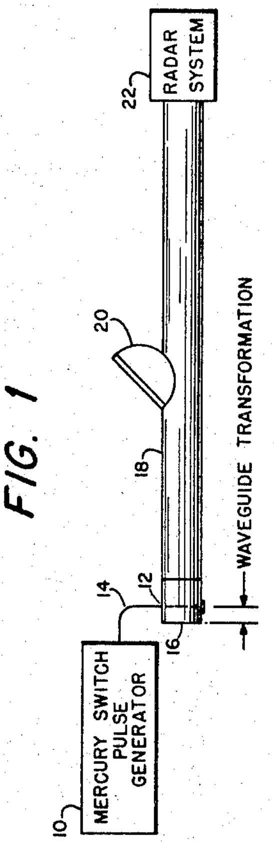
FIG. 1 illustrates the pulse generator of the invention.

Referring now to the drawings, wherein like reference characters designate like or corresponding parts throughout the several views, there is shown in FIG. 1 a video or modulation pulse generator 10 which typically could be a mercury switch generator. Pulse generator 10 is directly connected, as at 12, by a coaxial cable 14 to an opposite-side-shorted-type of coaxial-to-waveguide junction 16 which is shown symbolically in FIG. 1 and in greater detail in FIG. 2. As is well known in this art, this connection is geometrically and electrically arranged so as to possess the desired waveguide transformation or impedance transfer characteristics. Junction 16 in turn is connected to a waveguide 18 which includes a variable attenuator 20. Radar system 22 receives the short pulses of electromagnetic energy propagated in the waveguide 18. Because of the extreme shortness of the pulses propagated in waveguide 18 the radar 22 can be designed to have superior range resolution.

Figure 2:
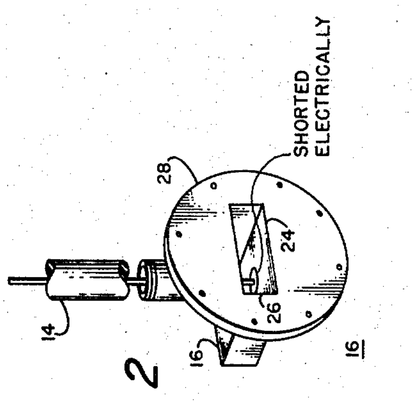
FIG. 2 shows in more detail the coaxial-to-waveguide junction which is an important part of the pulse generator, and FIG. 3 are wave forms which are useful in understanding the operation of the invention.

Junction 16 is shown in more detail in FIG. 2 wherein the coaxial cable 14 is shown connected, by an opposite-side-shorted-type of a connection, to a coaxial-waveguide junction 16 which has internal dimensions 24 and 26. As will be explained in greater length later herein, the internal dimensions 24 and 26 and the shorted connection determine to a large extent the operational characteristics of the pulse generator which constitutes the present invention. Junction 16 also includes a flange 28 which may be bolted to the waveguide 18.

In the operation of the invention, modulating pulses are repetitively generated by pulse generator 10, which is contemplated as being a mercury switch generator or the equivalent. As shown in FIG. 3*a*, the modulation pulse approximates the form of a square wave but is not exactly a square wave because of the finite rise time required. As will be appreciated by those skilled in wave analysis, there is a combination of reflected and incident wave fronts within the electrically-shorted coaxial-to-waveguide connector which influences the output of the microwave energy. This coaxial-to-waveguide connector is of the type where the coaxial input center conductor is shorted to the opposite waveguide wall as shown in FIG. 2. The coaxial input connection appears as a short circuit to the modulating energy received along the coaxial line. From the waveguide direction, however, the transition is not a short circuit because of impedance transformations due to waveguide geometry. Since the input modulating pulse with its finite rise time is electrically shorted and is reflected with an opposite polartiy, as shown in FIG. 3*a*, there is a rapid reversal of current within the coaxial-to-waveguide connector during the time it takes the modulating pulse to traverse the center conductor section within the waveguide, reach the short circuit, and to return. The rate of change of current on the center conductor of the coaxial connector is greater on the section within the waveguide than at other points on the coaxial line because of the difference in boundary conditions. It is the interaction of the changes in these current together with the internal geometry of connector 16 which generates the microwave energy and determines the duration and frequency band of the pulses that are propagated in the waveguide.

Figure 3:
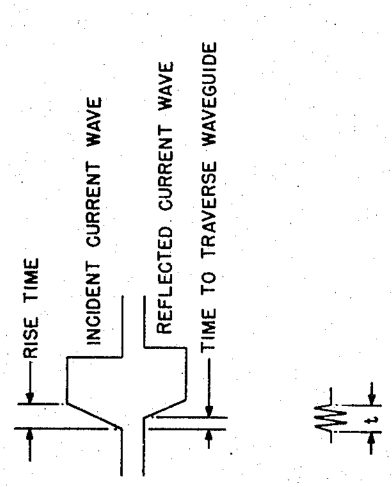

It will, of course, be recognized that the wave forms illustrated in FIG. 3 are merely representative and, because of drafting limitations, do not accurately display the relative frequency, time duration, amplitude and other characteristics of the modulation pulse (FIG. 3*a*) and the microwave pulse (FIG. 3*b*).

The microwave output pulses (FIG. 3*b*), which are of extremely short duration *t*, are propagated through the waveguide 18, to the transmitter portion of the radar system 22. Because of the extremely short duration, the radar system 22 is advantageously capable of improved range resolution in comparison to prior radar systems.

In a typical embodiment of the present invention, the modulation pulses were produced by generator 10 at a repetition rate of 100 pulses per second and each pulse had a duration of $5-10\times10^{-9}$ seconds and a rise time of less than $10^{-9}$ seconds. The amplitude of the modulation pulses from generator 10 was 20 volts.

When the internal dimensions 24 and 26 of the coaxial-to-waveguide 16 were .400 inch and .900 inch respectively, the microwave energy which was propagated in X-band waveguide 18 occurred in the band of 8000–12,000 m.c.p.s. Approximately one milliwatt of microwave energy was propagated in pulses having a duration on the order of $10^{-9}$ seconds and, of course, the same repetition rate as the modulation pulses.

It will be apparent that there has been disclosed a generator which is capable of producing extremely short pulses of microwave energy by utilizing the internal geometric dimensions and electrical connections of a coaxial-to-waveguide junction to isolate and propagate the desired frequency components from the frequency spectrum of a modulating pulse. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A generator for producing short pulses of microwave energy at a desired frequency band, said short pulses being suitable for use in a radar system, said generator comprising:
   - modulating pulse generating means for producing a pulse, the frequency spectrum of which includes said desired frequency band;
   - waveguide means suitable for propagating said desired frequency band and
   - connector means coupling said modulating pulse generating means to said waveguide means, said connector means functioning to pass said desired frequency band and to substantially not pass the other frequencies in said modulating pulse frequency spectrum.

2. A pulse generator as set forth in claim 1 wherein said connector means includes:
   - a coaxial cable connected to said modulating pulse generating means;
   - a coaxial-to-waveguide junction coupling said coaxial cable to said waveguide means, said junction having internal dimensions and electrical connections which cause said desired frequency band to be passed and said other frequencies in said modulating pulse frequency spectrum to be substantially attenuated.

3. A pulse generator as set forth in claim 2 wherein said modulating pulse generating means includes a mercury switch generator and the pulse produced by said modulating pulse generating means approximates a square wave and has a finite rise time.

4. In combination with a radar system, a generator for producing short pulses of microwave energy at a desired frequency band, said generator comprising:
   - modulating pulse generating means for repetitively producing pulses, the frequency spectrum of which includes said desired frequency band;
   - waveguide means suitable for propagating said desired frequency band and connected to said radar system and
   - connector means coupling said modulating pulse generating means to said waveguide means, said connector means functioning to pass said desired frequency band and to substantially not pass the other frequencies in said modulating pulse frequency spectrum.

5. The combination of a radar system and a pulse generator as set forth in claim 4 wherein said connector means includes:
   - a coaxial cable connected to said modulating pulse generating means;
   - a coaxial-to-waveguide junction coupling said coaxial cable to said waveguide means, said junction having internal dimensions and electrical connections which cause said desired frequency band to be passed and said other frequencies in said modulating pulse frequency spectrum to be substantially attenuated.

6. The combination of a radar system and a pulse generator as set forth in claim 5 wherein said modulating pulse generating means includes a mercury switch generator and the repetitive pulses produced by said modulating pulse generating means approximates a square wave having a finite rise time.

7. The combination of a radar system and a pulse generator as set forth in claim 6 wherein both the duration of said short pulses of microwave energy and said finite rise time are approximately $10^{-9}$ seconds.

References Cited

UNITED STATES PATENTS 2,433,758 12/1947 Hershberger -------- 331—166

ROY LAKE, *Primary Examiner.*

J. B. MULLINS, *Assistant Examiner.*